United States Patent [19]

Gebauer et al.

[11] 4,395,445

[45] Jul. 26, 1983

[54] COATING AND PRIMER FORMULATION ON THE BASIS OF A COPOLYMER OF TETRAFLUOROETHYLENE AND A PERFLUORO-(ALKYLVINYL) ETHER, AND USE THEREOF

[75] Inventors: Gerhard Gebauer; Franz Mayer, both of Burgkirchen, Fed. Rep. of Germany

[73] Assignee: Hoechst Aktiengesellschaft, Frankfurt, Fed. Rep. of Germany

[21] Appl. No.: 300,900

[22] Filed: Sep. 10, 1981

Related U.S. Application Data

[63] Continuation of Ser. No. 122,591, Feb. 19, 1980, abandoned.

[51] Int. Cl.³ ............................................. B05D 1/36
[52] U.S. Cl. ................................ 427/407.1; 428/422; 524/401; 524/520
[58] Field of Search ..................... 427/407.1; 428/422

[56] References Cited

U.S. PATENT DOCUMENTS 3,694,392  9/1972  Werner ........................... 260/29.6 F
4,252,859  2/1981  Concannon ......................... 428/422

Primary Examiner—Paul R. Michl
Attorney, Agent, or Firm—Connolly and Hutz

[57] ABSTRACT

Coating formulations having improved adhesion are described which are especially suitable as primer for top coats of fluorocarbon polymers, which comprise (a) a copolymer of tetrafluoroethylene units, units of a perfluoroalkylvinyl ether and optionally units of hexafluoropropylene or vinylidene fluoride, (b) optionally dispersed polytetrafluoroethylene particles in addition, (c) a mixture of lithium hydroxide and suspended fine-particle pyrogenic $SiO_2$, and (d) water as liquid carrier. The coating formulations are applied according to known methods to substrates such as metals, glass or ceramic surfaces. They may be used as single-layer systems without top coat, or as primer, the top coat being applicable immediately after a short-time drying only. Application fields are the coating of household equipment or technical apparatus, where a high-grade adhesion onto the substrate, combined with anti-adhesive properties and a smooth surface are obtained.

4 Claims, No Drawings

COATING AND PRIMER FORMULATION ON THE BASIS OF A COPOLYMER OF TETRAFLUOROETHYLENE AND A PERFLUORO-(ALKYLVINYL) ETHER, AND USE THEREOF

This application is a continuation of application Ser. No. 122,591 filed Feb. 19, 1980 now abandoned.

Suitable coatings and primers for fluorocarbon polymers are mixtures of chromic and phosphoric acid with dispersions of carbon tetrafluoride polymers, as described for example in U.S. Pat. Nos. 2,562,117 and 2,562,118. Operations using chromic acid, however, require high expenditure for safety, because compounds of hexavalent chromium are extraordinarily toxic. Moreover, the hexavalent chromium must be removed from the waste water of spray equipment by means of a complicated and expensive process.

For the obtention of solidly adhering coatings on fluorocarbon polymers, those primers which contain chromic and phosphoric acid must be dried at 80°–100° C. after having been applied onto the substrate, subsequently heated to a temperature of from 250° to 300° C., and then cooled to room temperature. Only after this heat treatment for which high energy expenditure is required and in which a large part of the stove capacity of a coating plant is lost, a further solidly adhering coat of fluorocarbon polymers can be applied.

In German Auslegeschrift No. 1,959,144, coating formulations, especially primer formulations, are described which in addition to fluorocarbon polymers contain lithium polysilicate, for the obtention of which a corresponding solution substantially free from other alkali metal ions must be prepared from lithium hydroxide and colloidal silica sol in a complicated and expensive process comprising several steps. German Auslegeschrift No. 21,10,768 describes primer coating dispersions consisting of an aqueous solution of lithium hydroxide containing fine-grained, pyrogenous silicium dioxide suspended therein, and a dispersion of a fluorocarbon polymer.

The primer and coating formulations described in German Auslegeschriften Nos. 19,59,144 and 21,10,768 allow to obtain coats of fluorocarbon polymers suitable also for the coating of pans and pots because no toxicity problems arise in these cases. Although the adhesion of the coats so obtained is sufficient for many applications which have not to meet severe requirements, it is inferior to that of coats of fluorocarbon polymers containing chromic and phosphoric acid in addition.

It is therefore the object of this invention to provide a coating formulation suitable especially as primer for the application of dispersions of fluorocarbon polymers, which is comparable with respect to adhesion to coating formulations containing chromic and phosphoric acid, and which, used as primer, can be dried in air at room temperature without requiring a heat treatment before application of a top layer of fluorocarbon polymers.

In accordance with the invention, this object is achieved by a coating and primer formulation which comprises:

(a) from 100 to 20 weight %, relative to the total polymer solids of the components (a) and (b), of a copolymer of copolymerized tetrafluoroethylene units; from 0.5 to 11 weight % of copolymerized units of a perfluoro(alkylvinyl) ether of the formula $CF_2=CF-OR$, in which R is a perfluoroalkyl radical having from 1 to 10 carbon atoms; and from 0 to 12 weight % of copolymerized units of hexafluoropropylene or vinylidene fluoride, each relative to the total weight of the copolymer;

(b) from 0 to 80 weight %, relative to the total polymer solids of components (a) and (b), of dispersed polytetrafluoroethylene particles having a mean grain size of from 0.05 to 30 $\mu$m;

(c) from 10 to 70 weight % of the weight sum of (a) plus (b) plus (c) of lithium hydroxide and suspended, fine-particle $SiO_2$ produced by thermal treatment; the molar ratio $LiOH:SiO_2$ being from 1:0.5 to 1:30; and (d) water as liquid carrier.

The copolymer used as component (a) contains from 0.5 to 11, preferably 1.5 to 6.0, weight % of copolymerized units of a perfluoro(alkylvinyl) ether of the formula $CF_2=CF-OR$, in which R is a perfluoroalkyl radical having from 1 to 10, preferably 2 to 4, and especially 3, carbon atoms, and from 0 to 12, preferably 0 to 6.5, weight % of copolymerized units of vinylidene fluoride or, preferably, hexafluoropropylene. The remainder, relative to the total weight of the copolymer, consists substantially of copolymerized units of tetrafluoroethylene. Especially preferred as component (a) is a copolymer of 0.4 to 6.5 weight % of copolymerized units of hexafluoropropylene and 1.5 to 6.0 weight % of copolymerized units of perfluoro(n-propylvinyl) ether; the remainder consisting likewise of copolymerized units of tetrafluoroethylene. The preparation of such copolymers is state of the art and described for example in U.S. Pat. Nos. 3,132,123, 3,235,537, 3,528,954, 3,642,742, 3,635,926, as is that of the preferred terpolymers in U.S. Pat. No. 4,029,868 and German Offenlegungsschrift No. 26,39,109.

The coating formulation of the invention may contain as component (b) in addition to component (a) from 0 to 80, preferably 0 to 50, weight %, relative to the total weight of the polymer solids of components (a) plus (b), of polytetrafluoroethylene particles dispersed in the liquid carrier. These polytetrafluoroethylene particles may be dispersed in the form of particles of colloidal size, or suspended in the form of particles exceeding colloidal size. The average size of these polytetrafluoroethylene particles should be from 0.05 to 30 $\mu$m; preferred is a range of from 0.1 to 3 $\mu$m. By polytetrafluoroethylene, there is to be understood not only the usual high molecular weight polytetrafluoroethylene, but within the scope of this invention also the so-called polytetrafluoroethylene waxes formed by degradation of high molecular weight polytetrafluoroethylene, or telomerization reaction of tetrafluoroethylene, which waxes can be used in accordance with the invention in a molecular weight of at least 10,000, preferably of at least 100,000.

However, those coating and primer formulations are preferred which contain as fluorocarbon polymer component exclusively the copolymers of component (a).

The coating and primer formulation of the invention contains as component (c) a mixture of lithium hydroxide and finely dispersed silicium dioxide produced by a thermal treatment and suspended in the liquid carrier. The molar ratio of $LiOH:SiO_2$ in this mixture is from 1:0.5 to 1:30, preferably 1:1 to 1:12. This component (c) mixture is present in the coating formulation of the invention in an amount of from 10 to 70, preferably 25 to 60, weight %, relative to the weight sum of components (a), optionally (b) and (c). The finely dispersed silicium dioxide produced by a thermal treatment which is used for this mixture is a commercial product, and it is manufactured according to known processes either by reaction, and thus burning, of certain silicium compounds such as $SiCl_4$ or silanes, or by sublimation of silicium compounds such as quartz, silicic acid and others in an electric arc. This $SiO_2$ produced in such thermal processes, known as pyrogenic silica or fumed silica, is present nearly exclusively in the form of agglomerated particles having a relatively broad size distribution in a range of from 0.01 to 50, preferably 0.05 to 25, $\mu m$; the mean particle size being in a range of from about 0.5 to 40, preferably 2 to 20, $\mu m$. For preparing such silicium dioxide suspensions in a lithium hydroxide solution, the lithium hydroxide is dissolved in deionized water, and the fine-grain, heat-treated $SiO_2$ is stirred in.

The coating and primer formulation of the invention comprises furthermore the component (d) that is, water as liquid carrier, which is preferably present in such an amount that the amount of components (a), optionally (b) and (c) is from 12 to 60, preferably 15 to 40, weight % of the total weight of the coating formulation.

In the case where the coating formulation of the invention is used as single-layer system, usual fillers and pigments such as iron oxide, carbon black, mica or titanium dioxide may be added in an amount of from 1 to 40, preferably 5 to 25, weight %, relative to the weight of components (a) plus (b) plus (c). Optionally, such pigments may be added also when the formulation is used as primer.

The copolymer of component (a) is preferably employed in the form of a colloidal dispersion having a mean particle size of from 0.05 to 3 $\mu m$. Colloidal dispersions having a content of from 10 to 20 weight % of polymer solids, as obtained in emulsion polymerization of the cited comonomers may be directly used. Preferably, however, such dispersions are first concentrated according to known methods, for example by decanting, to a polymer solids content of from 20 to 60 weight %. Alternatively, the copolymers of component (a) may be employed in the form of a powder obtained from colloidal dispersions by coagulation (for example by agitation with high shearing forces or by addition of electrolytes). Such powders are then redispersed in water, thus yielding dispersions having a mean particle size in the range of from 3 to 30 $\mu m$. Furthermore, suspension polymers such as obtained in suspension polymerization of the cited comonomers with addition of small amounts of emulsifiers may also be used, which likewise have a mean particle size of from 3 to 30 $\mu m$ or may be ground to attain this grain size, in order to be employed for the coating formulations of the invention.

The coating formulation of the invention is preferably prepared by mixing aqueous dispersions or suspensions of component (a) with the abovementioned aqueous suspension of aqueous lithium hydroxide and $SiO_2$ produced by heat treatment. In the case where component (b) is present, it is used preferably in the form of an aqueous dispersion or suspension, too; the sequence of mixing being not critical, that is, component (a) or component (b) may be mixed with (c) and the corresponding other component may be added. Likewise, components (a) and (b) may be mixed first and then added in total to (c). When one of the components (a) or (b) are used in the form of a powder and the other in the form of a colloidal dispersion, the pulverulent component must first be dispersed in component (c), for example by means of a high-speed agitator or other dispersing equipment, and subsequently the other component in the form of a colloidal dispersion is added. As far as the coating and primer formulation of the invention contains pigments, they are preferably added to component (c) before mixing; in the case where (a) or (b) or the mixture thereof are present in the form of a suspension, the pigments may be added alternatively to these components.

The coating formulation of the invention is suitable as single-layer system for the coating of all materials resistant to the following sintering process, especially metals, glass or ceramic substrates. In the case where a metal surface is to be coated, it is previously roughened by sandblasting or etching, for example with dilute mineral acids, in order to improve the adhesion.

The coating formulation is applied according to known methods, for example dipping, lamination or spraying. When the formulation of the invention is used as single-layer system, the coat has to be dried after application at 80° to 300° C., and then baked at 290°–460° C., preferably 320° to 400° C.

Drying and sintering times should each be about 5 to 30 minutes. For a single-layer coat, a thickness of from about 5 to 30, preferably 5 to 10, $\mu m$ is obtained. Application of several layers for obtaining a thickness greater than 30 $\mu m$ is also possible.

When the coating formulation is used as primer for further coats of fluorocarbon polymers, especially polytetrafluoroethylene, the substrate is likewise roughened by sandblasting or etching in the case where it has a smooth surface. The primer is then applied by means of a spray gun or other devices. The advantage of the formulation or the invention being employed as primer resides in the fact that after application and subsequent short-time drying of the primer in air, at about room or a slightly higher temperature (15°–40° C.), the top coat of fluorocarbon polymers can be applied immediately without deteriorating the good adhesion. Optionally, the drying may be renounced completely, and the top coat is applied directly onto the moist primer coat, thus obtaining nevertheless an excellent adhesion. Primers on the basis of phosphoric and/or chromic acid must in any case be dried after their application at 80° to 100° C. and sintered at 250° to 300° C. as well as subsequently cooled before applying a top coat, because just this heat treatment ensures a good bond between the primer and the top coat. In contrast thereto, drying in air of the primer of the invention in the cited temperature range is absolutely sufficient.

As top coat, there may be used a dispersion of polytetrafluoroethylene alone, or a dispersion modified with pigments and known anionic, cationic or nonionic wetting agents, flow-promoting agents and film-forming agents. Suitable wetting agents are for example nonylphenol oxethylated with 8 to 12 mols of ethylene oxide, or sodium lauryl sulfate; as flow-promoting agents there are used toluene or xylenes, and silicone resins such as described in U.S. Pat. Nos. 2,462,242 and 2,470,593 are employed as film-forming agents.

Suitable top coats are furthermore dispersions of copolymers prepared from perfluoro(alkylvinyl) ethers and tetrafluoroethylene, and optionally a third monomer such as hexafluoropropylene or vinylidene fluoride, especially having the same composition as component (a). Mixtures of polytetrafluoroethylene dispersions and such copolymer dispersions may also be used. Such compositions can be modified as the polytetrafluoroethylene dispersions with pigments, wetting agents, flow-promoting and film-forming agents.

The coating and primer formulation of the invention is used preferably for the obtention of solidly adhering anti-adhesive coats or primer coats for cooking, baking, roasting and grilling equipment. Further application fields are for example the coating of flat iron bottoms, sliding elements, dosage devices etc., that is, articles where the coat is subjected to heavy mechanical strain and thus the valuable properties are especially appreciated.

The coating and primer formulations of the invention provide especially a surprising improvement of adhesion to the substrate, as compared with those coating formulations which instead of the component (a) of the invention contain a copolymer of tetrafluoroethylene and hexafluoropropylene.

The following examples illustrate the invention.

EXAMPLE 1

11.2 g of lithium hydroxide are dissolved in 182.0 g of deionized water. 28.0 g of silicium dioxide produced by heat treatment are stirred into this solution, and dispersed for 1 hour by means of a propeller mixer. The suspension is then abandoned for 24 hours. Subsequently, 280.0 g of a dispersion of a terpolymer containing 1.5 weight % of hexafluoropropylene units, 3.5 weight % of perfluoro(n-propylvinyl) ether units and 95 weight % of tetrafluoroethylene units and having a melt flow index of 30 g/10 min (372° C., load of 5 kg) and a melting point of 307° C. are added with agitation. This dispersion was previously concentrated by decantation to a solids content of 50 weight %.

Aluminum plates are sandblasted with corundum (grain size 100 to 120 μm) to obtain a microinch finish of from 5 to 10 μm. The above primer dispersion is then applied to the surface so pretreated by means of a spray gun in a thickness of from 5 to 10 μm. The aluminum plates so coated are abandoned for 10 minutes at room temperature, and subsequently, a polytetrafluoroethylene dispersion containing 60 weight % of solids is applied. The two layers are then dried first for 10 minutes at 90° C., then for 10 minutes at 250° C., and finally sintered for 10 minutes at 400° C.

The adhesion of the coating so obtained is tested according to German Industrial Standard DIN 53 151 (cross-cut test). An adhesion of GT O is stated in this test.

EXAMPLE 2

4.7 g of lithium hydroxide are dissolved in 198 g of deionized water. 47.0 g of $SiO_2$ produced by heat treatment is stirred into this solution as described in Example 1. Subsequently, 47.1 g of a dispersion containing 50 weight % of a terpolymer, and then 50 g of a dispersion containing 50 weight % of high molecular weight polytetrafluoroethylene are added and mixed. The terpolymer contains 94.1 % by weight of tetrafluoroethylene units, 1.5 weight % of hexafluoropropylene units and 4.4 weight % of perfluoro (n-propylvinyl) ether units and has a melting point of 304° C. The melt flow index is 24.5 g/10 min, at a load of 5 kg and a temperature of 372° C.

The suspension so obtained is applied by means of a spray gun onto aluminum plates pretreated as described in Example 1, in a layer having a thickness of from about 5 to 10 μm.

Subsequently, without drying, a second dispersion is applied as top coat onto the still moist coat. This dispersion is composed as follows: 30 parts by weight of a 50 weight % dispersion of the above terpolymer, 70 parts by weight of a 60 weight % polytetrafluoroethylene dispersion, 1 part by weight of sodium lauryl sulfate, 6.1 parts by weight of a nonionic wetting agent (octylphenol oxethylated with an average of 9 ethylene oxide units), 3 parts by weight of glycol, 1 part by weight of carbon black, 17.1 parts by weight of titanium dioxide, 10 parts by weight of a solution of 50 weight % of silicone resin (methylphenyl-polysiloxane) in ethyl acetate and xylene (2:1), 5 parts by weight of xylene and 5 parts by weight of tetralin.

Both layers are dried for 10 minutes at 90° C. and for 10 minutes at 250° C., and baked for 10 minutes at 400° C. A well adhering antiadhesive coat having an excellent adhesion quality is obtained. The result of the cross-cut test according to DIN 53 151 is GT O.

EXAMPLE 3

11.2 g of lithium hydroxide are dissolved in 182.0 g of deionized water. 28.0 g of silicium dioxide produced by heat treatment are stirred into this solution. The suspension is abandoned for 24 hours. Subsequently, 280 g of a dispersion of a terpolymer (composition as in Example 1) are added with agitation 77 g of a suspension consisting of 7 weight % of carbon black and 92 weight % of water and 1 weight % of a nonionic wetting agent (octylphenol oxethylated with an average of 9 ethylene oxide units) are added to this mixture.

The mixture is applied onto sandblasted aluminum plates by means of a spray gun, and dried for 10 minutes at 90° C., for 10 minutes at 250° C., and baked for 10 minutes as 400° C. A black, well adhering coat is obtained. Cross-cut test: GT O.

EXAMPLE 4

0.746 g of lithium hydroxide is dissolved in 82.0 g of deionized water. 7.5 g of silicium dioxide produced by heat treatment are stirred into this solution, and dispersed for about 1 hour by means of a propeller mixer. The suspension is then abandoned for 24 hours. Subsequently, 159.0 g of a dispersion of a terpolymer (composition as in Example 1), having a melting point of 304° C. and a melt flow index of 24.5 g/10 min. at a load of 5 kg and a temperature of 372° C. are added with agitation. The dispersion was previously concentrated to a solids content of 50 weight % by decantation.

Aluminum plates are pretreated and coated as described in Example 1. The plates so coated are abandoned for 10 minutes at room temperature. Subsequently, a top coat dispersion is applied by means of a spray gun. This dispersion is composed as follows: 100 parts by weight of a 60 weight % polytetrafluoroethylene dispersion. 1 part by weight of sodium lauryl sulfate, 6.1 parts by weight of a nonionic wetting agent (octylphenol as above), 3 parts by weight of glycol, 1 part by weight of carbon black, 17.1 parts by weight of titanium dioxide, 10 parts by weight of a solution of 50 weight % of silicone resin in ethyl acetate and xylene (2:1), 5 parts by weight of xylene and 5 parts by weight of tetralin.

Both layers are dried and baked as indicated in Example 2. The adhesion of the coat obtained is tested according to DIN 53 151 (cross-cut test), and the result is GT O to GT 1.

EXAMPLE 4a (COMPARATIVE TEST)

0.746 g of lithium hydroxide is dissolved in 82.0 g of water. 7.5 g of silicium dioxide produced by a heat treatment are stirred into this solution and dispersed for 1 hour by means of a propeller mixer. The suspension is then abandoned for 24 hours. Subsequently, 159.0 g of a dispersion containing 50 weight % of a copolymer consisting of 22 weight % of hexafluoropropylene and 78 weight % of tetrafluoroethylene units are added with agitation.

This primer dispersion is applied as described in Example 4, the cited top coat is spread over it, and both layers are dried and baked as indicated.

The adhesion test according to DIN 53 151 has a result of GT 4.

EXAMPLE 5

3.1 g of lithium hydroxide are dissolved in 106 g of deionized water. 30.9 g of silicium dioxide produced by heat treatment are stirred into this solution. The suspension obtained is abandoned for 24 hours. Subsequently, 110 g of a dispersion containing 50 weight % of a terpolymer (composition as in Example 1, characterized in Example 4) are added and mixed.

EXAMPLE 5a (COMPARATIVE TEST)

3.1 g of lithium hydroxide are dissolved in 106 g of deionized water. 30.9 g of silicium dioxide produced by heat treatment are stirred into this solution. The suspension obtained is abandoned for 24 hours. Subsequently, 110 g of a dispersion containing 50 weight % of a copolymer of hexafluoropropylene and tetrafluoroethylene (composition as in Example 4a) are added with agitation.

The primer dispersion described in Examples 5 and 5a are applied onto sandblasted aluminum plates as described in Example 4, the top coat is applied as indicated there, and both layers are dried and baked in the manner as described.

The adhesion of the coats of Example 5 is GT O to GT 1 according to DIN 53 151, while the coats of Example 5a have an adhesion of GT 4.

EXAMPLE 6

1.49 g of lithium hydroxide are dissolved in 1200 g of deionized water. 92.9 g of silicium dioxide produced by heat treatment are stirred into this solution. The suspension so obtained is abandoned for 24 hours. Subsequently, 142 g of a 50 weight % dispersion of a terpolymer containing 1.5 weight % of hexafluoropropylene units, 3.2 weight % of perfluoro(n-propylvinyl) ether units and 95.3 weight % of tetrafluoroethylene units are added. The terpolymer has a melting point of 310° C. and a melt flow index of 15 g/10 min at 372° C. and a load of 5 kg.

The mixture is applied by means of a spray gun onto sandblasted aluminum plates, and dried for 5 minutes in air at room temperature. Subsequently, the top coat dispersion as described in Example 2 is applied. Both layers are dried for 10 minutes each at 90° and 250° C. and sintered at 400° C.

A well adhering anti-adhesive coat having good adhesion properties is obtained. The cross-cut test according to DIN 53 151 shows a value of GT O to GT 1.

EXAMPLE 7

11.2 g of lithium hydroxide are dissolved in 475.2 g of deionized water, and subsequently, 111.8 g of silicium dioxide produced by heat treatment are stirred in. After 24 hours, this suspension is mixed with 1386.5 g of a suspension of a copolymer, which copolymer contains 3.3 weight % of perfluoro(n-propylvinyl) ether units and 96.7 weight % of tetrafluoroethylene units, and has a melt flow index of 12.5 g/10 min at 372° C. and a load of 5 kg.

The suspension of the copolymer was prepared by a 12 hour grinding of 300 g of the copolymer in 1185 g of water and 15 g of octylphenol oxethylated with an average of 9 ethylene oxide units in a ball mill. The mixture is applied onto sandblasted aluminum plates as described in Example 1.

After drying at room temperature for 10 minutes, a polytetrafluoroethylene dispersion containing 60 weight % of solids is applied as described in Example 1. The coat so obtained has an adhesion value of GT O according to DIN 53 151.

EXAMPLE 8

3.1 g of lithium hydroxide are dissolved in 50.3 g of deionized water, and 15.4 g of $SiO_2$ produced by heat treatment are stirred in. The suspension is abandoned for 24 hours. Subsequently, 14.8 g of a dispersion of a terpolymer is added and mixed. The dispersion of the terpolymer and the terpolymer as such are composed as indicated in Example 6. The suspension so obtained is applied onto aluminum plates as described in Example 1. After drying in air for 10 minutes, a second layer, composed as in Example 2, is applied, and both layers are dried for 10 minutes each at 90° and 250° C., and sintered at 400° C.

An anti-adhesive coat having an adhesion value of GT O according to DIN 53 151 is obtained.

EXAMPLE 9

3.1 g of lithium hydroxide are dissolved in 107.2 g of deionized water. 30.9 g of $SiO_2$ produced by heat treatment are stirred into this solution and dispersed for about 1 hour by means of a propeller mixer. The suspension is abandoned for 24 hours. Subsequently, 55 g of a 50 weight % dispersion of a terpolymer are stirred in. The terpolymer contains 6.3 weight % of hexafluoropropylene units, 2.3 weight % of perfluoro(n-propylvinyl) ether units, and 91.4 weight % of tetrafluoroethylene units. The melt flow index is 8.8 g/10 min at 372° C. and a load of 5 kg, and the melting point is 280° C.

The suspension so obtained is applied onto aluminum plates as in Example 1.

A polytetrafluoroethylene layer applied on top as in Example 1 has an adhesion of GT O according to DIN 53 151.

EXAMPLE 10

Example 2 is repeated; however, instead of the dispersion of polytetrafluoroethylene having the usual high molecular weight 50 g of a dispersion of 50 weight % polytetrafluoroethylene wax having a molecular weight of 150 000 is used which was prepared by emulsion polymerization of tetrafluoroethylene in the presence of chloroform.

Primer coat and top coat (identical composition as in Example 2) are applied as indicated in Example 2.

The coat so obtained has an adhesion of GT O to GT 1 according to the cross-cut test of DIN 53 151.

What is claimed is:

1. A method for improving the coating of a substrate with a fluoropolymer which comprises applying a primer composition and subsequently without an intermediate heat treatment for sintering applying a topcoat of a tetrafluoroethylene homopolymer or copolymer wherein the improvement comprises applying a primer composition consisting essentially of (a) from 100 to 20 weight %, relative to the total polymer solids of the components (a) and (b), of a copolymer of copolymerized tetrafluoroethylene units; from 0.5 to 11 weight % of copolymerized units of a perfluoro(alkylvinyl) ether of the formula $CF_2=CF-OR$, in which R is a perfluoroalkyl radical having from 1 to 10 carbon atoms; and from 0 to 12 weight % of copolymerized units of hexafluoropropylene or vinylidene fluoride, each relative to the total weight of the copolymer;

(b) from 0 to 80 weight %, relative to the total polymer solids of components (a) and (b), of dispersed polytetrafluoroethylene particles having a mean grain size of from 0.05 to 30 μm;

(c) from 10 to 70 weight % of the weight sum of (a) plus (b) plus (c) of lithium hydroxide and suspended, fine-particle $SiO_2$ produced by thermal treatment; the molar ratio LiOH: $SiO_2$ being from 1:0.5 to 1:30; and (d) water as liquid carrier.

2. The method of claim 1, wherein the component (a) of the primer composition in the copolymer contains from 0.4 to 6.5 weight % of copolymerized units of hexafluoropropylene and 1.5 to 6.0 weight % of copolymerized units of perfluoro(n-propylvinyl) ether and copolymerized tetrafluoroethylene units.

3. The method of claim 1, wherein the weight sum of components (a), (b) and (c) of the primer composition is from 12 to 60 weight percent.

4. The method of claim 1, wherein the primer composition contains in addition pigments and fillers.

* * * * *